US008662264B2

(12) United States Patent
Legeret

(10) Patent No.: US 8,662,264 B2
(45) Date of Patent: Mar. 4, 2014

(54) SAFETY BRAKE DEVICE WITH FORCE STORE ELEMENT

(75) Inventor: Benoit Legeret, Lucerne (CH)

(73) Assignee: Inventio AG, Hergiswil (CH)

( * ) Notice: Subject to any disclaimer, the term of this patent is extended or adjusted under 35 U.S.C. 154(b) by 355 days.

(21) Appl. No.: 13/003,052

(22) PCT Filed: Jul. 11, 2008

(86) PCT No.: PCT/EP2008/059111
§ 371 (c)(1), (2), (4) Date: Jan. 7, 2011

(87) PCT Pub. No.: WO2010/003466
PCT Pub. Date: Jan. 14, 2010

(65) Prior Publication Data

US 2011/0155523 A1 Jun. 30, 2011

(51) Int. Cl.
*B60T 8/72* (2006.01)
*B61H 7/12* (2006.01)
*B66B 5/04* (2006.01)
*F16F 1/34* (2006.01)

(52) U.S. Cl.
USPC .............. 188/180; 188/43; 267/162; 187/375

(58) Field of Classification Search
USPC .............. 188/180, 43–44; 187/287–288, 351, 187/375; 267/158, 161–162, 251–252
See application file for complete search history.

(56) References Cited

U.S. PATENT DOCUMENTS

| | | | | |
|---|---|---|---|---|
| 2,581,297 | A | 1/1952 | Rissler | |
| 2,716,467 | A * | 8/1955 | Callaway | 187/376 |
| 3,830,344 | A * | 8/1974 | Cervenec et al. | 188/171 |
| 5,197,571 | A * | 3/1993 | Burrell et al. | 187/350 |
| 5,353,895 | A * | 10/1994 | Camack et al. | 187/369 |
| 5,511,868 | A * | 4/1996 | Eftefield | 305/148 |
| 2003/0178758 | A1* | 9/2003 | Metelski | 267/166 |
| 2008/0116624 | A1* | 5/2008 | Chun et al. | 267/169 |

FOREIGN PATENT DOCUMENTS

| | | | |
|---|---|---|---|
| EP | 1298083 | B1 | 11/2005 |
| EP | 1657204 | A2 | 5/2006 |
| EP | 1739045 | A1 | 1/2007 |
| JP | 06191759 | A | 7/1994 |
| JP | 2001002342 | A | 1/2001 |
| JP | 2006160440 | A | 6/2006 |

* cited by examiner

*Primary Examiner* — Anna Mompper

(74) *Attorney, Agent, or Firm* — Fraser Clemens Martin & Miller LLC; William J. Clemens

(57) ABSTRACT

A catch device, for example in a safety device of an elevator mechanism, includes at least one first force store element and one second force store element having different force storage rates, and a displacement limit for the first force store element.

14 Claims, 10 Drawing Sheets

SAFETY BRAKE DEVICE WITH FORCE STORE ELEMENT

FIELD OF THE INVENTION

The present invention relates to a safety brake device which is, for example, a component of a safety device for elevator equipment. In this connection, the safety brake device serves for fixing an elevator car to a guide rail. Moreover, the present invention relates to a safety device with a corresponding safety brake device, to elevator equipment with a corresponding safety device and to a method for actuating a safety brake device according to the invention.

BACKGROUND OF THE INVENTION

Elevator equipment usually comprises an elevator car and at least one counterweight, which are moved in opposite sense in an elevator shaft. The elevator car and the at least one counterweight in this regard run in or along guide rails. For reasons of safety, elevator equipment is usually equipped with a safety brake device which is part of a safety device. The safety brake device engages the guide rails of the elevator car and/or of the counterweight. The speed of movement of the elevator car or of the counterweight is thereby slowed down or reduced to zero by fixing of the safety brake device to the guide rail. Triggering of the brake or fixing is carried out by means of a speed limiter device which constantly monitors and limits the speed of the elevator car or of the counterweight.

This limitation of the speed is carried out, for example as disclosed in patent specification EP-B1-1 298 083, by coupling the elevator car or the counterweight with a limiter cable of the speed limiter by means of a linkage and lever mechanism. The limiter cable is guided in the shaft head over a cable pulley of the speed limiter and in the shaft pit over a return roller. During travel, the elevator car drives the limiter cable and the speed of the elevator car is monitored by the speed limiter via the limiter cable. In the case of excess speed of the elevator car the speed limiter blocks the cable pulley, in which case the elevator car drags the limiter cable over the cable pulley. By the friction at the cable pulley the limiter cable actuates the lever mechanism at the elevator car and engages the safety brake device in that the limiter cable exerts, by way of the linkage and lever mechanism, a tension on the safety brake device arranged at the elevator car. This tension in turn brings one or also two wedge-shaped and roller-mounted brake shoes of the safety brake device into a first (frictional) contact setting at the guide rail. A spring column, which is formed from plate springs and which is arranged opposite the brake shoes in a pincer-like double-lever construction, is thereby in turn activated. It is thus achieved that the tension force in the linkage and lever mechanism is not the actual braking force, but only the triggering force for the safety brake device. The effective braking force is exerted by, in particular, the spring column. The same way of functioning applies to the counterweight. Monitoring of the car speed can also be carried out, for example, electronically and the safety brake device triggered, for example, electromagnetically. The traditional mechanical speed limiter and the traditional limiter cable are redundant in this last-mentioned variant.

Patent specification U.S. Pat. No. 2,581,297 discloses a safety device with a similarly constructed safety brake device, in which the braking force is generated by a spiral spring.

However, these known safety brake devices have the following disadvantages:

The force store element, be it a spring column formed from individual plate springs as in EP-B1-1 209 083 or a helical spring as in U.S. Pat. No. 2,581,297, has no safety reserves.

Failure of this single force store element has the consequence of failure of the safety brake device.

There are countries having safety regulations for safety-relevant parts in elevator equipment which prescribe a safety reserve which would not be fulfilled by the two known safety brake devices.

The manner of functioning of the safety brake device can be optimized with respect to preservation of material, the course of the braking force and thus the deceleration sensed by elevator users in the elevator car.

SUMMARY OF THE INVENTION

According to the invention the mentioned disadvantages could be eliminated on the one hand by the arrangement of at least two force store elements instead of only one and on the other hand by optimization of the overall path of the force/travel characteristic curve. Moreover, in correspondence with the invention the force store elements can be selected to be different in such a manner that the individual characteristic curves thereof are complementary in a specific manner. Beyond that, it is a feature of the invention that in the design of a safety brake device according to the invention a washer projecting beyond the outer diameter of the force store elements is arranged between the different force store elements. This washer, after a defined degree of compression of the first, weaker force store element, impinges on the end edge of a cylindrical housing which is open at one end and surrounds the weaker force store element. In accordance with the invention it is achieved in this mode and manner that the two force store elements are preserved, because they work only in a region allocated thereto. Moreover, the weaker force store element is no longer loaded to its maximum. A further advantage of the design according to the invention is a more comfortable, gentler response of the safety brake device. The braking force builds up in steps and is not supplied, as in the past, with whole maximum force. In addition, failure of the (first, weaker) force store element means only loss of the just-described increase in comfort and material preservation and no longer automatically failure of the entire safety brake device.

All kinds of springs come into consideration as force storage elements. In this regard, they can be, in particular, plate springs which selectably form so-called spring columns with plate spring packets assembled in series or also in parallel. However, helical plate springs, spiral springs, leaf springs or gas pressure springs (usually pneumatic) or also hydraulic springs (for example valve chamber springs) or also combinations of all mentioned spring types also come into consideration.

Plate springs basically have a digressive characteristic curve, i.e. with increasing spring deflection the spring rate (spring constant or force storage rate) exponentially decreases. According to the invention plate spring arrangements or force store elements having a progressive characteristic curve (exponentially rising spring rate) are preferred. However, according to the invention the resulting characteristic curve of the force store element combination at least provides a preferably progressive, but at least wholly or even only partly linearly rising, characteristic curve.

The resulting characteristic curve of the force store element combination can be non-constant, i.e. from the point at which the end edge of the cylindrical housing impinges on the washer and thus stops further compression of the first, weaker force store element an abrupt decline in or also rise of the braking force value of the safety brake device can occur. However, a preferred design variant of a safety brake device according to the invention allows the second, stronger force store element to connect, by its characteristic curve, seamlessly with the characteristic curve of the first, weaker force store element so that a constant overall characteristic curve of the force store element combination results.

However, regardless of whether the overall characteristic curve has a non-constant or constant path, the relationship of the force store elements can be so selected that exclusively the first, weaker force store element comes into use in the case of, for example, a faulty control. The second, stronger element thereagainst comes into use only in the case of, for example, a support means breakage and the higher forces connected therewith. This inventive adaptation of the characteristic curves to the possible disturbance situations opens up the possibility, for example in the case of recording the disturbance situations, of undertaking a more economic exchange or maintenance of only that force store element which was actually affected.

The constancy of the overall characteristic curve can be technically realized in that the second force store element has such a high spring rate that compression of this force store element is permitted only from the point of impinging of the end edge of the cylindrical housing on the washer. In other words, the absolute amount of the absorbed compression force—and thereby caused restoring spring force—at which the first store element drops out is identical with the start-off value of the second force store element. The constancy, but also an increasing monotony, of the overall characteristic curve (substitute spring characteristic curve) can, however, also be realized in that the working regions of the force store elements overlap at least partly so that the sum of the individual characteristic curves gives the desired resultant overall characteristic curve. Moreover, according to the invention influence on the overall characteristic curve is achievable in that the cylindrical housing and/or the washer is or are designed to be resilient.

The cylindrical housing can, moreover, optionally be formed from a disc and a tube. The disc can in this connection for reasons of cost be identical with the washer separating the two force store elements. The cylindrical housing or tube can, in addition, externally surround the force store element, but also be constructed internally as a spacer sleeve. For the weaker force store element it does not matter whether a travel limitation is provided internally or externally.

A further preferred embodiment of a safety brake device according to the invention comprises a biasing device for the force store elements. This can be realized, for example, in a simple and known manner by means of a screw in a threaded sleeve, which are so arranged at a spring pin that rotations of the screw compress or relax the force store elements displaceably mounted at the spring pin. However, this known biasing device in conjunction with the arrangement according to the invention of at least one weaker and at least one stronger force store element is accompanied by the fact that adjusting movements of the biasing device act exclusively or predominantly only on the weaker force store element. Biasing for the second, stronger force store element is—insofar as the force store elements have separate, mutually connected working ranges and do not overlap—possible only if the cylindrical housing impinges on the washer. As a result in the case of the first, weaker force store element one is no longer in the realm of just any bias, but a bias over the maximum provided stroke.

In order, however, to also be able to bias the second, stronger force store element, a further preferred embodiment of a safety brake device according to the invention provides a spring pin featuring different outer diameters and thus abutments. It is possible with a corresponding biasing device, which separately engages and stresses only the second, stronger force store element, to subsequently achieve a desired amount of bias exclusively for this second, stronger force store element in that, for example, spacer washers are used. These spacer washers impinge on the abutment after release of the biasing device. The spacer washers thus limit or the abutment thus limits relaxation movements, but not compression movements, of the force store element. In order to be able to be subsequently mounted, the spacer washers are preferably formed to be crescent-shaped and can be plugged onto the respective outer diameter of the spring pin. The spacer washers are securable by an enclosure against unintended dropping off. The use in accordance with the invention of a biasing device additionally offers the advantage that in the event of possible disassembly the force store elements can be released from their bias in controlled manner.

The biasing of the first, weaker force store element is then carried out in known manner by actuation of the screw, which engages the spring pin, after biasing of the second, stronger force store element has been undertaken in the afore-described manner.

Instead of abutments the spring pin can optionally also be designed so that it has a continuous, identical outer diameter, but forms detent positions for the washer, into which the latter can be rotated in the manner of a bayonet coupling.

The axial adjustability of the washer along the longitudinal axis of the spring pin and/or, however, also an adjustability in the same direction as the cylindrical housing leads or lead to a further variant of embodiment in accordance with the invention of a safety brake device in which the spacing between the cylindrical housing and the washer can be adjusted. The stroke of the first force store element can thereby be set optionally in addition to the afore-described biasing by the screw.

A further variant of embodiment in accordance with the invention provides three different force store elements. For separate, prior biasing of the then two stronger force store elements, corresponding biasing devices can optionally be provided and a spring pin, which then has three different outer diameters. In this connection it has to be noted that the weakest force store element is arranged on the largest outer diameter, the middle one on the middle outer diameter and the strongest force store element on the smallest outer diameter.

The safety brake device according to the invention preferably generates the braking force by means of a so-called spring column formed from individual plate springs lined up on the spring pin. In this connection, the plate springs can be arranged in series or in parallel or in double or triple arrangements in series or in parallel. The individual plate springs are preferably made of stainless and heat-resistant spring steels. Coming into consideration for that purpose are, for example, copper alloys (CuSn 8, CuBe 2) and nickel alloys (Nimonic, Inconel, Duratherm) or chromium-vanadium alloys or, however, also porcelain. Nimonic and Inconel are trademarks of Special Metals Corporation of New Hartford, N.Y. and Duratherm is a trademark of VACUUMSCHMELZE GmbH & Co. KG of Hanau, Germany. In principle, according to the invention plate springs of Group 2 according DIN 2093 are preferred, but the use of plate springs of Group 1 or Group 3 is also possible. The surface roughness of the plate springs is preferably Ra<6.3. These materials and values are stated by way of example and it is within the scope of the invention to achieve the assembly, in accordance with the invention, of at least one weaker and stronger force store element with different spring types, but also with different dimensions (outer diameter, inner diameter, thickness) and materials and material combinations.

As already mentioned, a safety brake device according to the invention can be arranged not only at the elevator car, but also at the counterweight. The safety brake device can for its part be placed on the elevator car or on the counterweight itself, for example at the underside thereof, but also at the upper side thereof.

The afore-described safety brake device has the advantage, by comparison with safety brake devices which act on the support means itself, that secure emergency braking can always be carried out irrespective of a support means breakage or irrespective of the point at which the support means breaks.

Further advantages offered by a safety brake device according to the invention are improved hysteresis characteristics and simplified disassembly when releasing the safety brake device after use or repair or maintenance operations, since a single travel range is newly divided up into two or more travel ranges.

A safety brake device according to the invention can also be employed on inclined elevators, drilling apparatus, shelf stackers and other person or material conveying installations. Moreover, it is suitable for safety-braking not only of downward movements of the elevator car, but also upward movements, which can be caused by, for example, faulty controlling. For this purpose, a safety brake device according to the invention can also be attached—optionally additionally to the previously disclosed modes and locations of mounting—turned through 180 degrees at the roof of the elevator car.

The present application discloses at least two force store elements which are connected in series, such as, for example, spring columns formed from plate springs and lined up on a pin. The principle according to the invention can, however, also be realized by force store elements where one encloses the other. Thus, for example, the weaker or the stronger force store element can have an inner diameter which receives the other force store element.

Further or advantageous embodiments of the safety brake device according to the invention or of the correspondingly designed elevator equipment form the subjects of the dependent claims.

DESCRIPTION OF THE DRAWINGS

The invention is explained in more detail symbolically and by way of example on the basis of figures.

The figures are described conjunctively and generally. The same reference numerals signify the same components and reference numerals with different indices indicate functionally equivalent or similar components.

DESCRIPTION OF PREFERRED EMBODIMENTS

Figure 1:
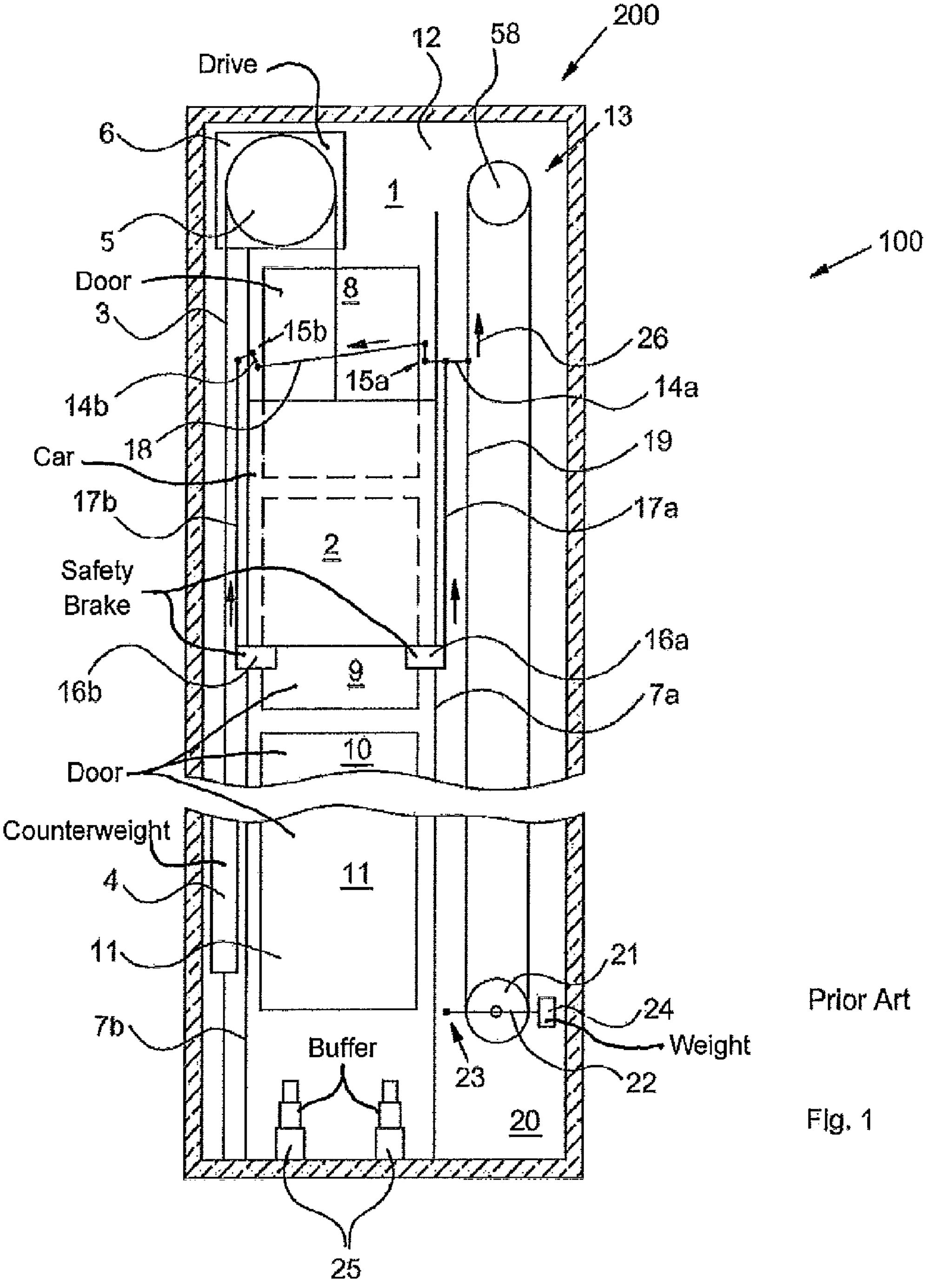
FIG. 1 shows a schematic sectional illustration of elevator equipment with a safety device with a safety brake device, which corresponds with the current state of the art.

FIG. 1 shows elevator equipment 100 with an elevator car 2, which is movable in an elevator shaft 1 and which is connected with a counterweight 4 by way of a support means 3. The support means is, in operation, driven by a drive pulley 5 of a drive unit 6. The elevator car 2 and the counterweight 4 are guided by means of guide rails 7*a* and 7*b* extending over the shaft height. The elevator equipment has an uppermost floor with an uppermost floor door 8, a second-uppermost floor with a second-uppermost floor door 9, further floors with further floor doors 10 and a lowermost floor with a lowermost floor door 11. The drive unit 6 and a speed limiter 13, which at a different speed stops the elevator car 2, are arranged in a shaft head 12. For this purpose a respective double lever 14*a* or 14*b* is arranged at each of two opposite sides of the elevator car 2 and is articulated to the elevator car 2 at a respective fulcrum 15*a* or 15*b*.

Moreover, the double lever 14*a* is fixedly connected with a limiter cable 19 of the speed limiter 13. The limiter cable 19 is guided in the shaft head 12 around a cable pulley 58 of the speed limiter 13 and in a shaft pit 20 around a return roller 21. Also located in the shaft pit 20 is a pair of buffers 25. During travel, the elevator car 2 drives the limiter cable 19 and the speed of the elevator car 2 is monitored by the speed limiter 13 via the limiter cable 19.

In the case of excess speed of the elevator car 2 the speed limiter 13 blocks the cable pulley 58, in which case the elevator car 2 drags the limiter cable 19 around the cable pulley 58. Due to the friction at the cable pulley 58 the limiter cable 19 exerts a tension force on the double lever 14*a* in upward direction in correspondence with the arrow direction 26. Thus actuated, the double lever 14*a* rotates about a fulcrum 15*a*. As a result, on the one hand a traction is transmitted in upward direction by way of a linkage 17*a* to a safety brake device 16*a*. On the other hand, however, insofar as the elevator equipment 100 in accordance with a preferred embodiment—as illustrated—is equipped with a second safety brake device 16*b* coupled with the first safety brake device 16*a*, the double lever 14*a* additionally transmits a pressing movement to a connecting rod 18 by means of a rigid, approximately 90-degree angle arm which at its vertex is articulated at the fulcrum 15*a* to the elevator car 2. This connecting rod 18 in turn presses on the further, second double lever 14*b*, which similarly to the first double lever is formed from a rigid, approximately 90-degree angle arm articulated at its vertex at the fulcrum 15*b* to the elevator car 2. The pressure of the connecting rod 18 thus produces a rotation of the double lever 14*b* and this in turn is transmitted by a linkage 17*b* as a traction movement to the second safety brake device 16*b*.

The illustrated safety device 200 thus comprises the speed limiter 13 and at least one double lever 14*a*, 14*b*, which triggers the safety brake device 16*a*, 16*b* by a traction force by means of the linkage 17*a*, 17*b*. In principle, however, it is also possible to couple the traction movement of the limiter cable 19 with a lever arrangement which triggers the safety brake device 16 not by pulling, but by pushing.

The endless limiter cable 18 is tensioned by means of the return roller 21 arranged in the shaft pit 20, wherein a roller axle mount 22 is articulated at one end at a fulcrum 23 and carries a tensioning weight 24 at the other end. The support means 3, as also the limiter cable 19, can be a steel-wire cable or aramide cable, a belt or band or a V-belt or V-ribbed-belt.

Figure 2:
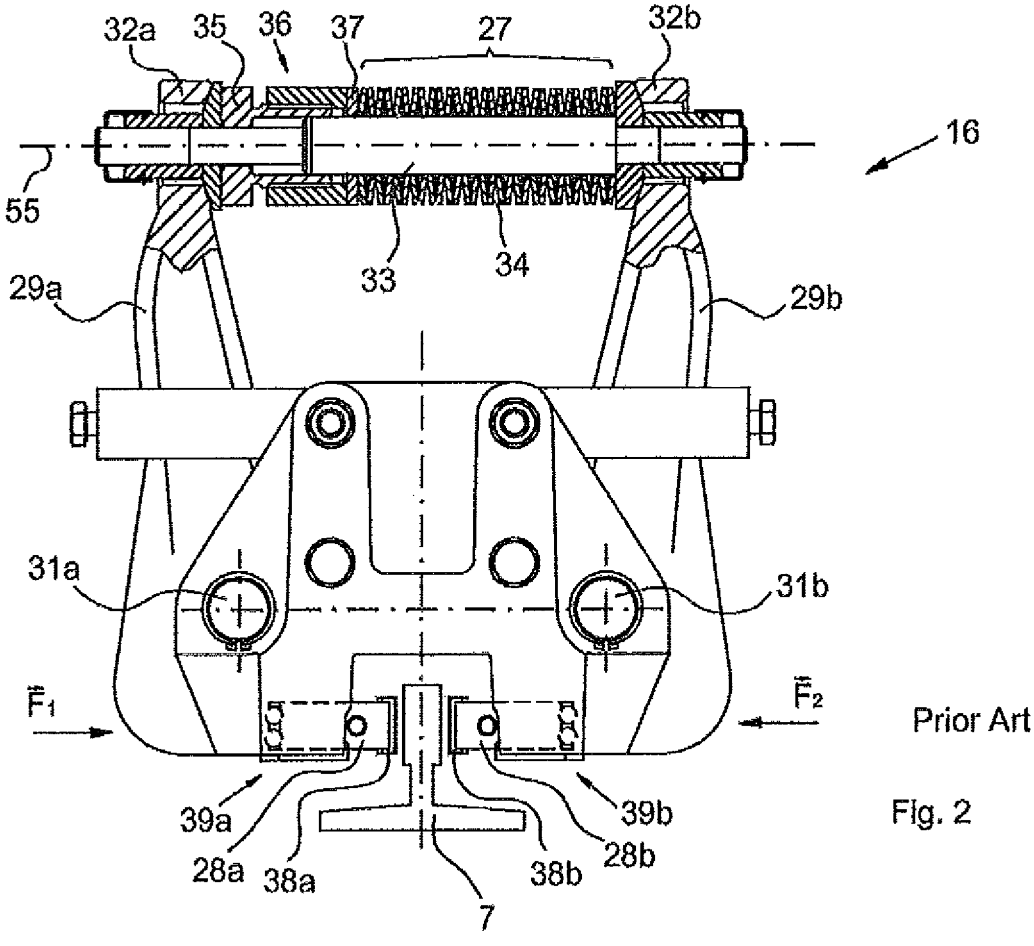
Prior Art Fig. 2
FIG. 2 shows a schematic sectional illustration of a safety brake device which corresponds with the current state of the art.
Figure 4B:
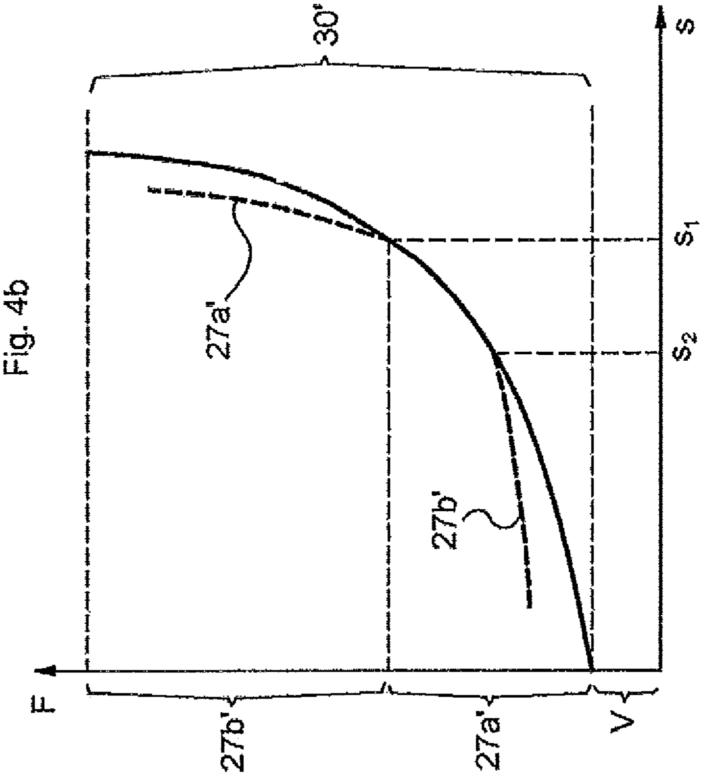
FIG. 4*b* shows an illustration of the cumulative characteristic curve of the force store elements of the safety brake device of FIG. 3 with a constant and progressive course.
Figure 4A:
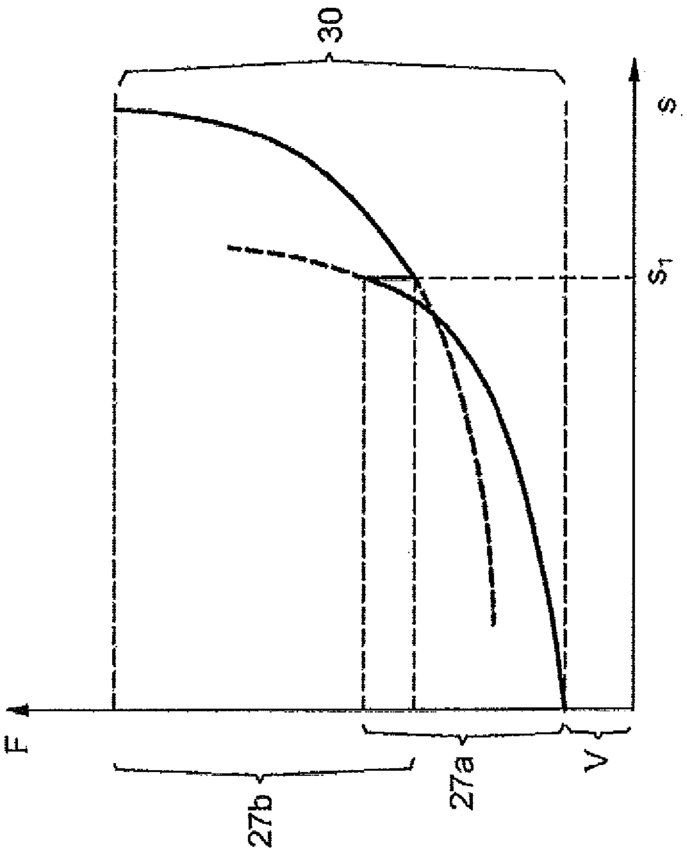
FIG. 4*a* shows an illustration of a cumulative overall characteristic curve of the force store elements of the safety brake device of FIG. 3 with a non-constant and progressive course.

FIG. 2 schematically shows, as a sectional illustration, a safety brake device 16 corresponding with the current state of the art. A force store element 27 is constructed as a spring column in that in each instance a pair of plate springs 34 in series and thus-formed plate spring pairs are then in turn lined up parallelly on a pin 33 with a longitudinal axis 55. The force store element 27 can be biased with the help of a biasing screw 35 in a threaded bush 36 and a washer 37. The pin 33 is mounted in eyes 32*a*, 32*b* of brake levers 29*a*, 29*b*, wherein the latter are mounted as a symmetrical pair respectively in rotary bearings 31*a*, 31*b* and are formed as double levers. A spreading force of the force store element 27 thus acts on the opposite lever ends of the double lever pair as a pressure force F (see FIG. 4*a*), which is formed from the sum of the absolute amounts of the force vectors F1 and F2. The pressure force F is the pressing pressure by which two brake shoes 28*a*, 28*b* with brake linings 38*a*, 38*b* grip the guide rail 7.

The brake shoes 28*a* and 28*b* are of wedge-shaped form, which is not apparent in this view, and are each mounted in a roller cage 39*a* or 39*b*. It is thereby achieved that the traction force or also pressure force, which is described in FIG. 1, of the linkage 17*a*, 17*b* suffices merely as a triggering, activation force for the safety brake device 16 in that one brake shoe or also both brake shoes is or are held in an initial braking position. The actual braking force F of the force store element 27—as a spring-assisted reaction to its compression in accordance with Hooke's law—then builds up automatically due to the friction of the brake shoe 28*a*, 28*b* against the guide rail 7 and due to the wedging action of the brake shoe 28*a*, 28*b*.

Figure 3:
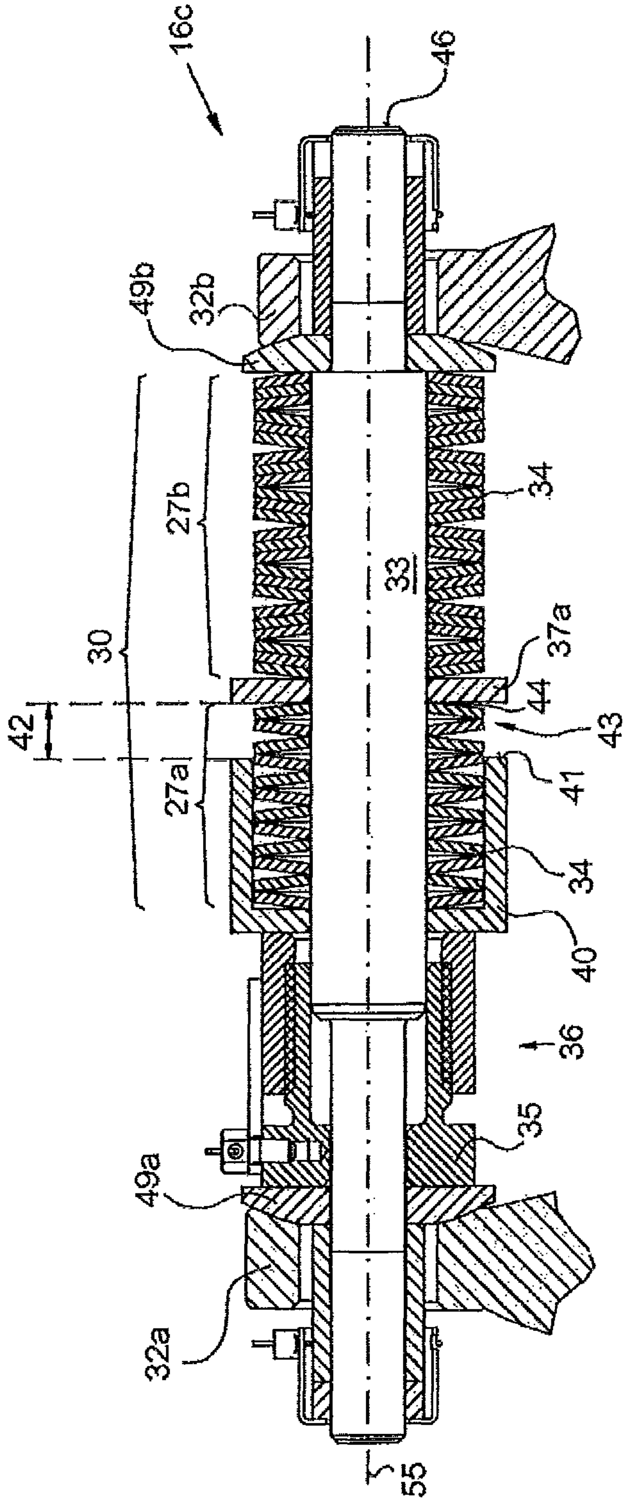
FIG. 3 shows a schematic sectional illustration of a part of a safety brake device according to the invention.

FIG. 3 shows schematically, in a sectional illustration, an embodiment of a safety brake device 16*c* according to the invention. By contrast with the safety brake device 16 shown in FIG. 2 it comprises not a solitary, single-stage force store element 27, but a force store element combination 30, which is formed from a first force store element 27*a* and a second force store element 27*b*. The first store element 27*a* is a spring column consisting of plate springs 34 which are lined up as spring plate pairs parallelly on the pin 33.

The second force store element 27*b* forms a spring column of plate springs 34, which are lined up as several serial triple arrangements parallelly also on the pin 33. However, the most diverse arrangements of plate spring combinations lie within the scope of the invention, be it in series or parallel, or also the most diverse arrangements of force store elements, i.e. also other kinds of springs, for example spiral springs, leaf springs, screw-plate springs or gas pressure springs or combinations thereof also come into consideration. According to the invention the force store element combination 30 is formed from two or more force store elements 27, which differ from or complement one another with respect to the spring rate and characteristic curve thereof in a mode and manner according to the invention.

The first force store element 27*a* is encased by a cylindrical housing 40. After a defined degree of compression of this force store element 27*a* an end edge 41 of the cylindrical housing 40 presses on a washer 37*a* arranged between the force store elements 27*a* and 27*b*. As a result, with an increasing degree of compression of the force store element combination 30 a compression of the first store element 27*a* ceases and an exclusive compression of the second force store element 27*b*—which here, as illustrated, comprises a greater number of and stronger plate spring packets than the force store element 27*a* and thus also as a higher spring rate—begins.

A further variant of embodiment, which is not illustrated in more detail in this figure, but again in accordance with the invention, provides additionally to that previously described an adjustment possibility of the maximum compression of the first, weaker force store element 27*a* in that a spacing 42 between the end edge 41 of the cylindrical housing 40 and the washer 37*a* can be regulated. This can be carried out, independently of the bias by means of the screw 35 in the threaded housing 36, by a further screw adjustment for the cylindrical housing 40. A further adjustment possibility of the spacing 42 can consist in that the washer 37*a* is so connected with the cylindrical housing by means of adjustable detent positions that a compression of the force store element 27*a* is possible, as before, up to a value of the spacing 42 equal to approximately zero, but not an increase in the value of the spacing 42 beyond the desired value of the bias of this force store element 27*a*.

Not only the biasing, which is known from the state of the art according to FIG. 2, by means of the screw 35, but also the afore-described adjustment possibility of the cylindrical housing 40 act—due to the fact that the safety brake device 16*c* according to the invention comprises a weaker force store element 27*a* and a stronger force store element 27*b*—exclusively or predominantly only on the weaker force store element. In other words, the stronger force store element 27*b* can no longer be biased without jumping over the preceding working range, which responds earlier, of the first force store element 27*a*.

In order to overcome this disadvantage, a further and preferred embodiment of a safety brake device according to the invention provides an adjustability of the washer 37*a*. According to the invention this adjustability is designed so that the washer 37*a* cannot move out to the left, towards the weaker force store element 27*a*, beyond defined and adjustable end positions. To the right, towards the eye 32*b*, the washer 37*a*, however, follows without hindrance pressure of an end face 44 of an outermost plate spring packet 43 of the force store elements 27*a* or—according to the respective design of the spring rate difference between the force store element 27*a* and the force store element 27*b*—the pressure of the end edge 41 of the cylindrical housing 40. It is achieved by this displaceability of the washer 37*a* to one side that the second, stronger force store element 27*b*, as seen by itself, can be biased, but as before can describe compression and expansion movements. However, the expansion movements do not exceed the set level of the bias.

Figure 3A:
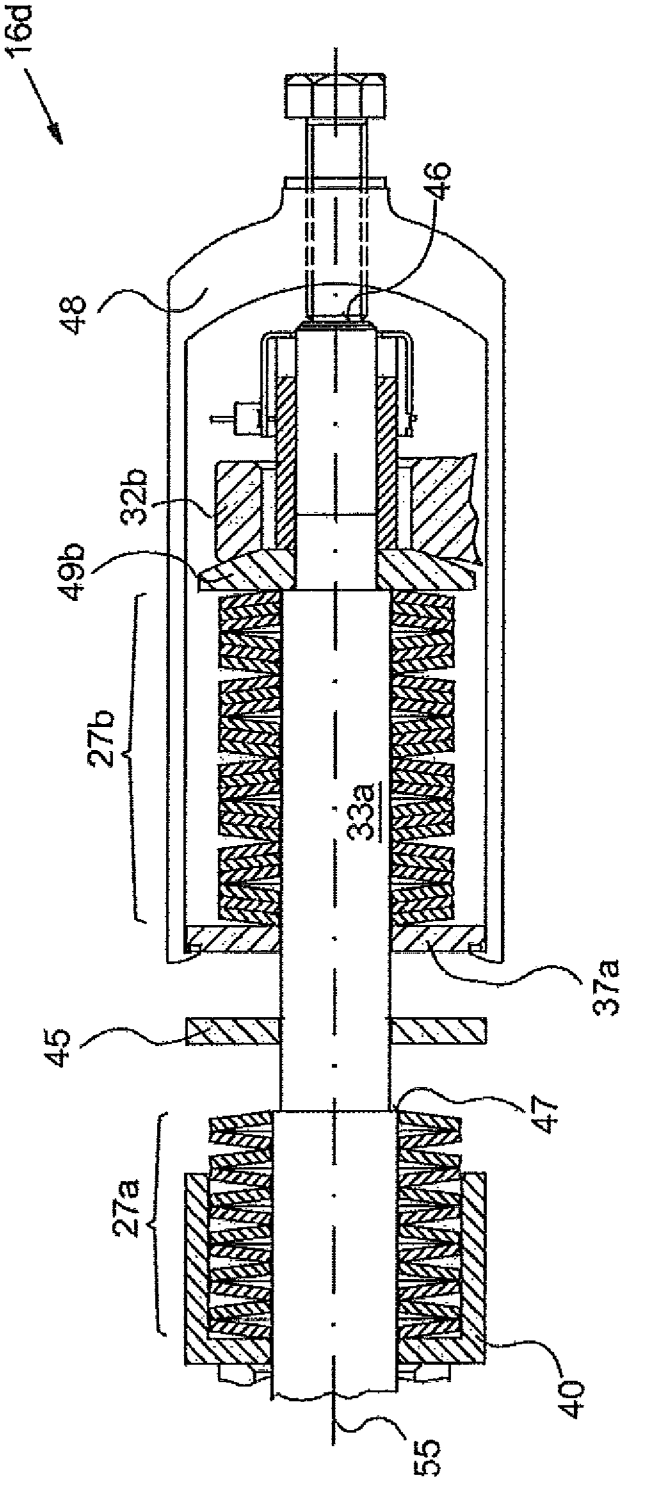
FIG. 3*a* shows a preferred variant of embodiment of the safety brake device according to the invention of FIG. 3 at the time of assembly.
Figure 3B:
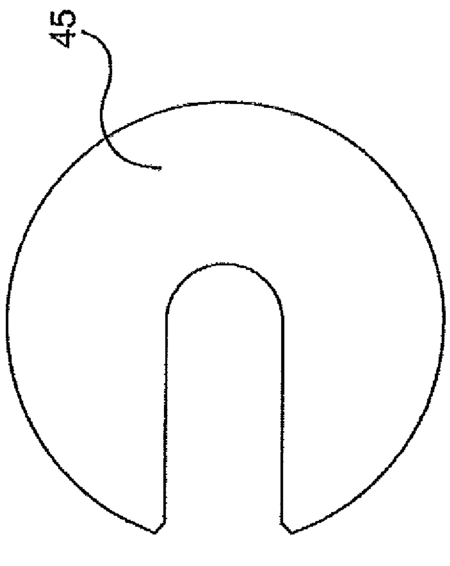
FIG. 3*b* shows a crescent-shaped washer.

FIGS. 3*a* and 3*b* show by way of example how the inventive feature of the separate capability of biasing the stronger force store element 27*b* can be technically realized in an embodiment of a safety brake device 16*d* according to the invention. The pin 33*a* has along the length of the force store element 27*b* a smaller diameter than along the length of the force store element 27*a* and thus forms an abutment 47 for the washer 37_a_. By means of a biasing device 48, placed against the washer 37_a_ and the eye 32_b_ or, as illustrated, against the washer 37_a_ and a pin end 46, it is possible at the time of assembly of the second force store element 27_b_ for its bias to be brought to a desired level and, as desired, for further washers 45, which are of crescent shape and are placed on the smaller diameter of the pin 33_a_, to be inserted. The biasing device 48 can subsequently be removed and the force store element 27_b_ has, due to the thickness of the washer 37_a_, plus the thickness or thicknesses of the crescent-shaped washer 45 or crescent-shaped washers 45, the desired level of bias. This described technical embodiment has the consequence that the inner diameter of the first force store element 27_a_ is greater than the inner diameter of the second force store element 27_b_. In order to safeguard against unintended dropping out, the crescent-shaped washers 45 together with the washer 37_a_ can be encased.

Alternatively thereto the abutment 47 can also be formed in that the pin consists of two parts which can be screw-connected. In this case the washers 45 do not have to be formed to be crescent-shaped, but can be complete like the washer 37_a_. This can be of advantage with respect to a higher acceptance of the shear forces arising in the washers 37_a_ and 45.

The sequence, which is shown in FIGS. 3 and 3_a_, of the arrangement with a centrally arranged weaker force store element 27_a_ and an outwardly arranged stronger force store element 27_b_ is by way of example. It can also be reversed, wherein experimental tests and practice will show whether, for example, it is of advantage if the stronger force store element 27_b_ is centrally arranged and thus the compression movements of the weaker force store element 27_a_ are performed more or less without involvement. Moreover, it is also conceivable that an arrangement of the cylindrical housing 40 at the outer edge, thus as close as possible to one of the eyes 32_a_, 32_b_, is to be preferred for reasons of stability. Thus, for example, a ring 49_b_, which bears against the eye 32_b_, could equally directly deform the cylindrical housing 40. A similar ring 49_a_ bears against the eye 32_a_.

Figure 4C:
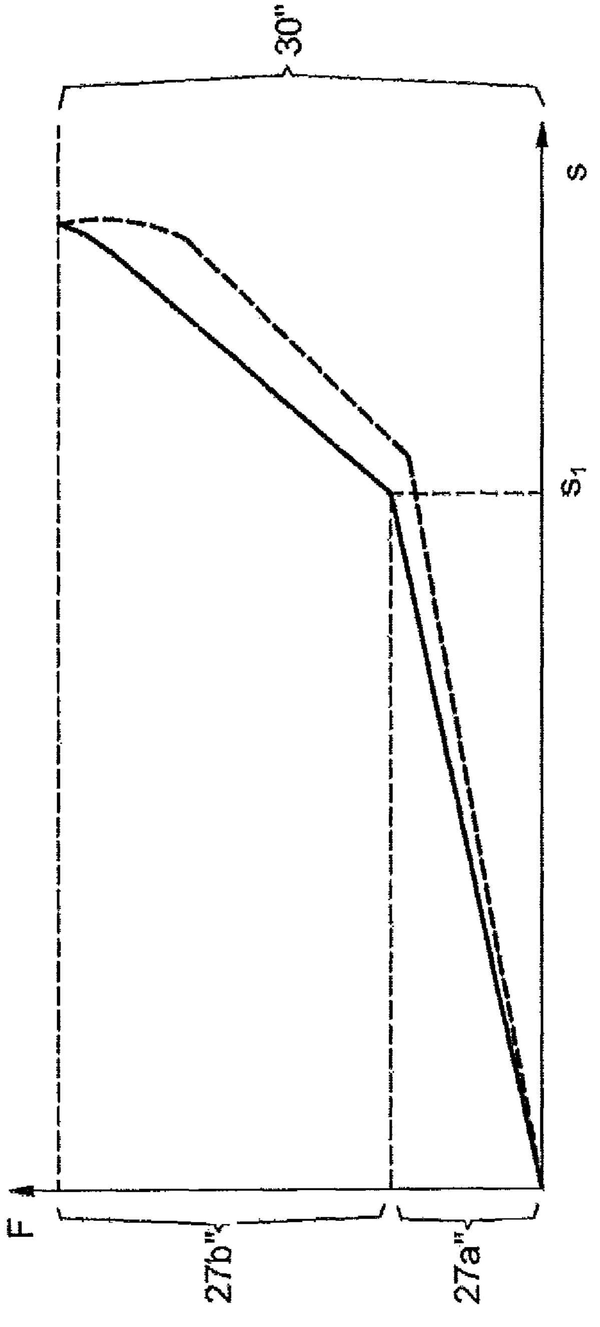
FIG. 4*c* shows an illustration of the cumulative characteristic curve of the force store elements of the safety brake device of FIG. 3 with a constant and linear course.

An exemplifying composite characteristic curve of the force store element combination 30, i.e. the individual characteristic curves of the first force store element 27_a_ and the second force store element 27_b_ according to FIG. 3, are illustrated in the FIG. 4_a_.

In FIG. 4_a_ it is apparent at the outset that a travel s (compression) equal to zero does not also correspond with a pressure force F equal to zero. This initial force, which is necessary in order to excite a spring, is generally the so-called breakaway force. However, in the present case it is a bias V which is superimposed thereon.

The characteristic curve of the force store element 27_a_ assigns a rising value for the pressure force F to each rising value for the travel s. It is thus regarded as intrinsically constant. In addition, it is progressive, i.e. the pressure force increases not only linearly with the path covered, but in an over-proportionally (exponentially) increasing ratio. The characteristic curve is in this case a curve or a parabola.

The dashed line continuing the characteristic curve of the force store element 27_a_ illustrates how the force store element would further behave if the end edge 41 of the cylindrical housing 40 were not to impinge on the washer 37_a_ at the point Si. The characteristic curve of the stronger force store element 27_b_ is also regarded as intrinsically constant and progressive and would, without the prior action of the weaker force store element 27_a_ up to the point $s_1$, begin with a higher pressure force in accordance with the dashed-line plot. From the point $s_1$, which corresponds with contact of the end edge 41 with the washer 37_a_, the pressure force F drops to a lower value than shortly beforehand. The overall characteristic curve for the force store element combination 30 is thus non-constant.

FIG. 4_b_ thereagainst shows a constant course of the overall characteristic curve of a force store element combination 30'. As illustrated, this can be realized in that a characteristic curve 27_a_' and a characteristic curve 27_b_' intersect. This would in turn mean that, even before the cylindrical housing 40 ends the working range of a first force store element 27_a_', a second force store element 27_b_' begins its work. A common working range $s_2$-$s_1$ thus results. This can be technically realized, for example, in that the first force store element 27_a_' has a linear characteristic curve from the point $s_2$ or in general has overall a linear characteristic curve. The characteristic curve of the second, stronger force store element 27_b_' can also be linear from the point $s_2$ to the point $s_1$, but opposite to the linearity of the characteristic curve of the first force store element 27_a_', so that the sum of these two linear ranges gives a resultant characteristic curve in a desired range.

However, the constant characteristic curve can also be achieved in that the working range of the second force store element 27_b_' begins seamlessly where the working range of the force store element 27_a_' comes to an end, i.e. the force store elements are so precisely matched to one another by their spring rates that at the termination of the compression of the first force store element 27_a_' by the cylindrical housing 40 the second force store element 27_b_' takes over the same amount of force. Represented graphically this would mean that the point $s_2$ coincides with the point $s_1$ on a continuous characteristic curve.

An overall characteristic curve of a force store element combination 30" composed respectively of a linear characteristic curve for the force store element 27_a_" and for the force store element 27_b_" is illustrated in FIG. 4_c_. The transition to the higher spring rate of the second force store element 27_b_" manifests itself as a kink of the overall characteristic curve at the point $s_1$. The dashed line illustrates the hysteresis curve of the force store element combination 30".

Figure 5:
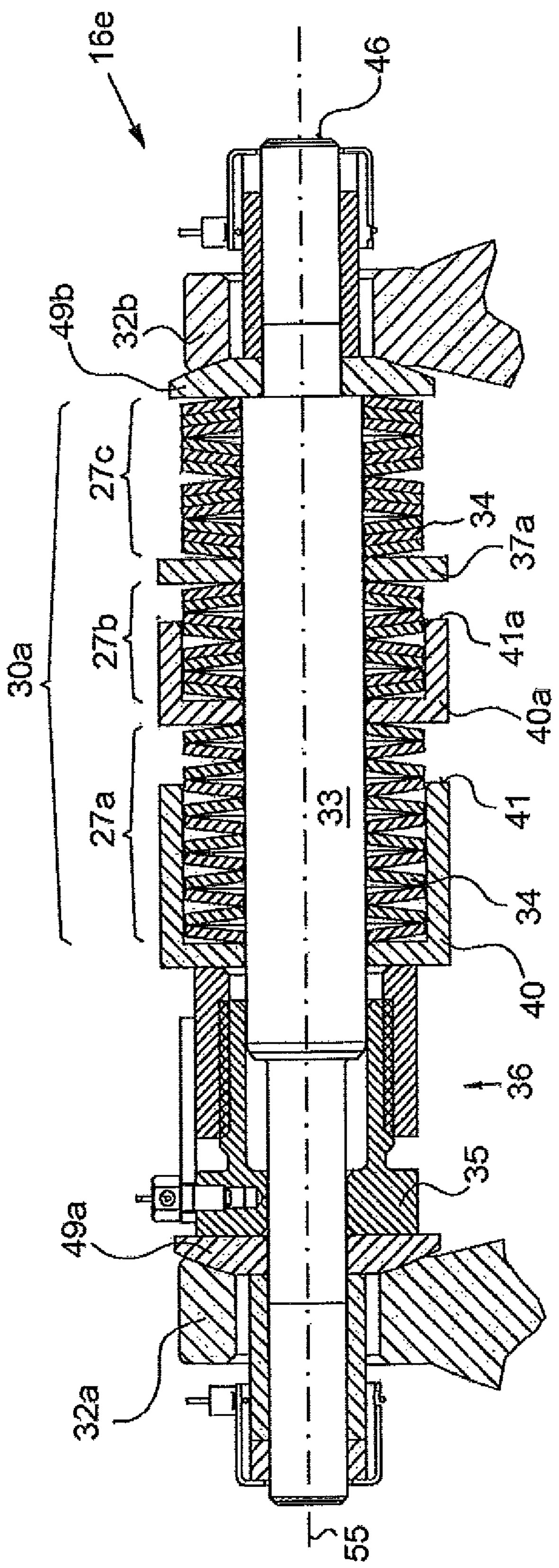
FIG. 5 shows a schematic sectional illustration of a part of a further safety brake device according to the invention.

FIG. 5 schematically shows, in a sectional illustration, a further embodiment according to the invention of a safety brake device 16_e_ in accordance with the invention. In this embodiment the force store element combination 30_a_ is formed from a first force store element 27_a_, a second force store element 27_b_ and a third force store element 27_c_. As can be seen at the symbolic illustration and arrangement of the plate springs 34, they form by pairs, which are each formed from a respective plate spring 34, the first, weakest force store element 27_a_. The second, middle force store element 27_b_ is formed from a doubled arrangement and the third, strongest force store element 27_c_ from a triple arrangement. For reasons of costs, exclusive use of the same plate springs 34 can be made in all three force store elements as illustrated. This is not a precondition of the invention, however, but only three force store elements 27_a_-27_c_ differing in their totality.

By contrast to the afore-described FIG. 3, the cylindrical housing 40 impinges not directly on the washer 37_a_, but initially on a further cylindrical housing 40_a_ which surrounds the second force store element 27_b_. This further cylindrical housing 40_a_ impinges on the washer 37_a_ only with an increasing degree of compression.

The force/travel plot thus takes place in cascade manner and according to the invention in one of the modes shown in FIGS. 4_a_-4_c_, individually or combined, but expanded only by one further stage.

FIG. 5_a_ shows schematically, in a sectional illustration, a further embodiment according to the invention of a safety brake device 16_f_ in accordance with the invention. In this embodiment the force store element combination 30_b_ is formed from a first force store element 27*d*, a second force store element 27*e* and a third force store element 27*f*. As can be seen from the symbolic illustration and arrangement of the respective plate springs 34*a*-34*c*, the force store element 27*d* is the weakest because it is formed from the smallest and thinnest plate springs 34*a*. The force store element 27*f* is the strongest, because the individual plate springs 34*c* are largest or thickest and at the same time are lined up in a triple arrangement on the pin 33*b*. The force store element 27*e* lies therebetween with respect to its characteristics and spring rate.

The arrangement of these three force store elements 27*d*-27*f* is as desired. It is thus illustrated, by way of example, in this variant of embodiment that the weakest force store element 27*d* bears against the eye 32*b* or the ring 49*b*. The ring 49*b* forms at the same time the cylindrical housing 40*b* surrounding the first force store element 27*d*. Due to the fact that the weakest force store element 27*d* in the arrangement illustrated here is arranged on the (righthand) side towards to the eye 32*b*, by contrast with the previously illustrated variant of embodiment the compression movement of the entire force store element combination 30*b* also begins on this side.

From a defined degree of compression of the force store element 27*d* the end edge 41*b* of the cylindrical housing 40*b* presses on the cylindrical housing 40*c* surrounding the second, middle force store element 27*e*. The compression of the first, weakest force store element 27*d* thereby drops out and the compression of the second force store element 27*e* begins only now or even before, again depending on the design of the difference in the spring rates between the first force store element 27*d* and the second force store element 27*e* or depending on whether it is desired that the working ranges of the force store elements 27*d* and 27*e* overlap. In the same functional manner, a further stage in the force store element combination 30*b* takes place on contact of the end edge 41*c* of the cylindrical housing 40*c* with the washer 37*a*, again depending on the design of the force store elements 27*e* and 27*f*.

The safety brake device 16*f* illustrated here has, in addition, the pin 33*b* with a different diameter for each individual force store element 27*d*-*f*. It is possible in this mode and manner to achieve, by appropriate stressing devices and the selection of an appropriate thickness of a housing wall 50 of the cylindrical housing 40*c* or an appropriate thickness of the washer 37*a*, a bias for those force store elements (27*e* and 270 which are stronger than the weakest force store element 27*d*.

Figure 5A:
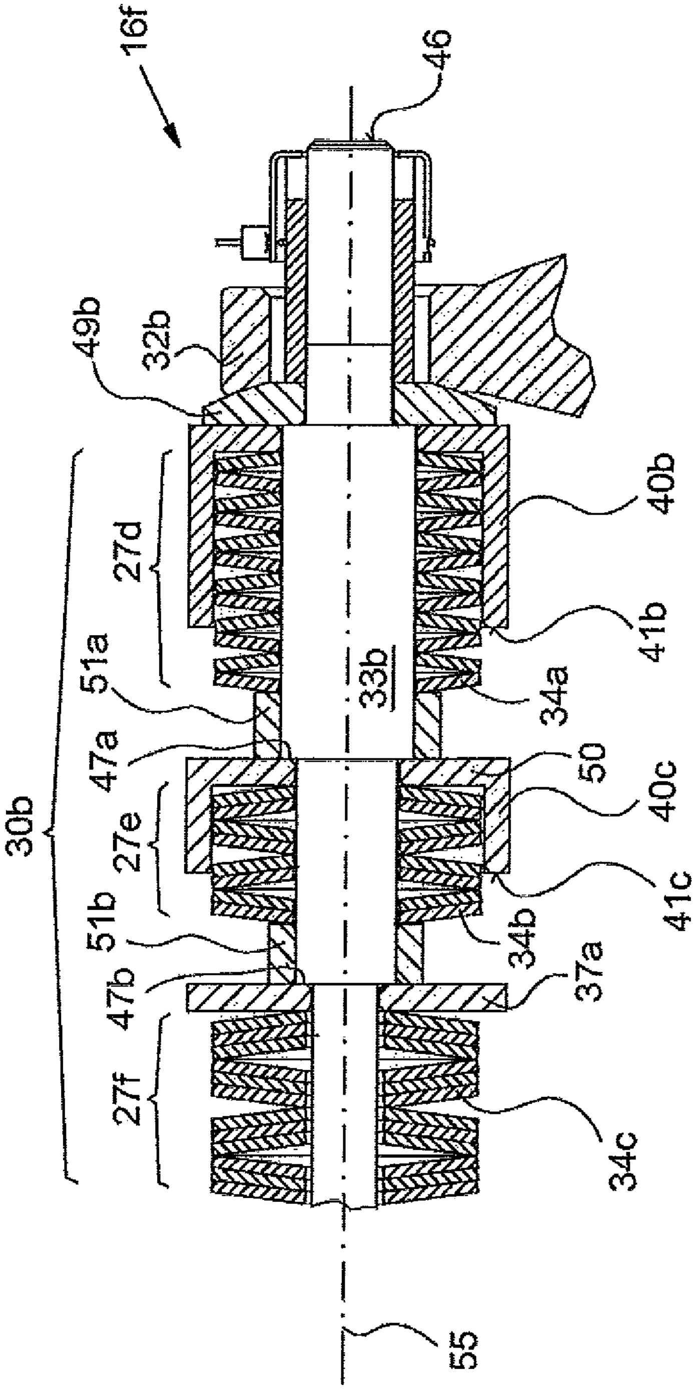
FIG. 5*a* shows a schematic sectional illustration of a part of another safety brake device according to the invention.

As already described in FIG. 3, the biasing device 36 by means of the screw 35, which is known from the prior art (see there) and which acts on the entire force store element combination 30*b*, would, in fact, bias only or primarily the weakest force store element 27*d*. This known biasing device 36 shown in FIG. 3 is not illustrated in the present FIG. 5*a*, but it would preferentially be placed in front of the side of the pin 33*b* opposite the eye 32*b*. In any event its presence makes clear that each of the three force store elements 27*d*-27*f*, even the weakest force store element 27*d*, can be biased. It is thus not necessary here to provide at the weakest force store element 27*d* a separate biasing possibility analogously to the embodiments with the stronger force store elements 27*e* and 27*f*.

As already demonstrated on the basis of possible characteristic curves of the individual force store elements, they can be designed so that initially the weakest force store element 27*d* describes its maximum travel and only then does the spring rate of the second force store element 27*e* allow compression or take-up of force. However, if this is not so and, as illustrated, the force store element consists of plate springs, then it can be the case that on compression of the first force store element 27*d* and, however, also simultaneous compression of the second, middle force store element 27*e* (overlapping characteristic curves as, for example, in FIG. 4*b*) the outermost plate spring 34*a* or also the adjoining plate spring or springs drops or drop out of the guide thereof in the sense that it or they falls or fall between a gap between an abutment 47*a* and the pressed-away end face of the cylindrical housing 50. In order to avoid this, spacers 51*a* or 51*b* which slide therewith can, as illustrated, be provided. They are slightly wider than the possible, above-described gap, which thus cannot even arise.

It is significant in any event that the largest diameter of the pin 33*b* has to be associated with the weakest force store element 27*d* and the smallest diameter of the pin 33*b* has to be associated with the strongest force store element 27*f*, otherwise the travels of the force store elements 27*d*, 27*e* are blocked by the abutments 47*a*, 47*b*.

Figure 5C:
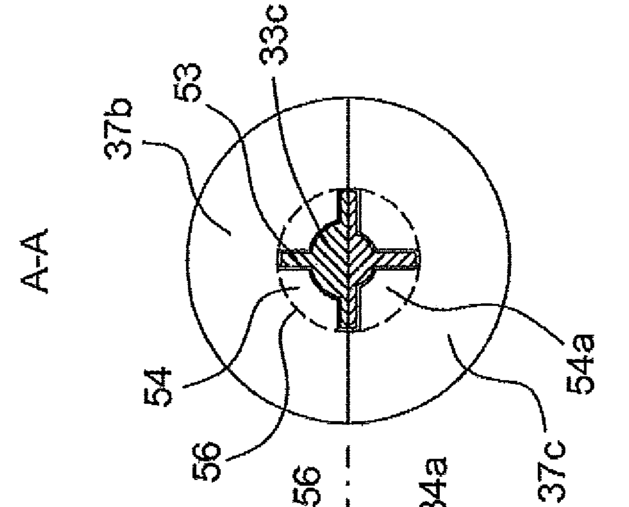
FIG. 5*c* shows a sectional illustration along the section axis A-A of the part of the safety brake device of FIG. 5*b*.
Figure 5B:
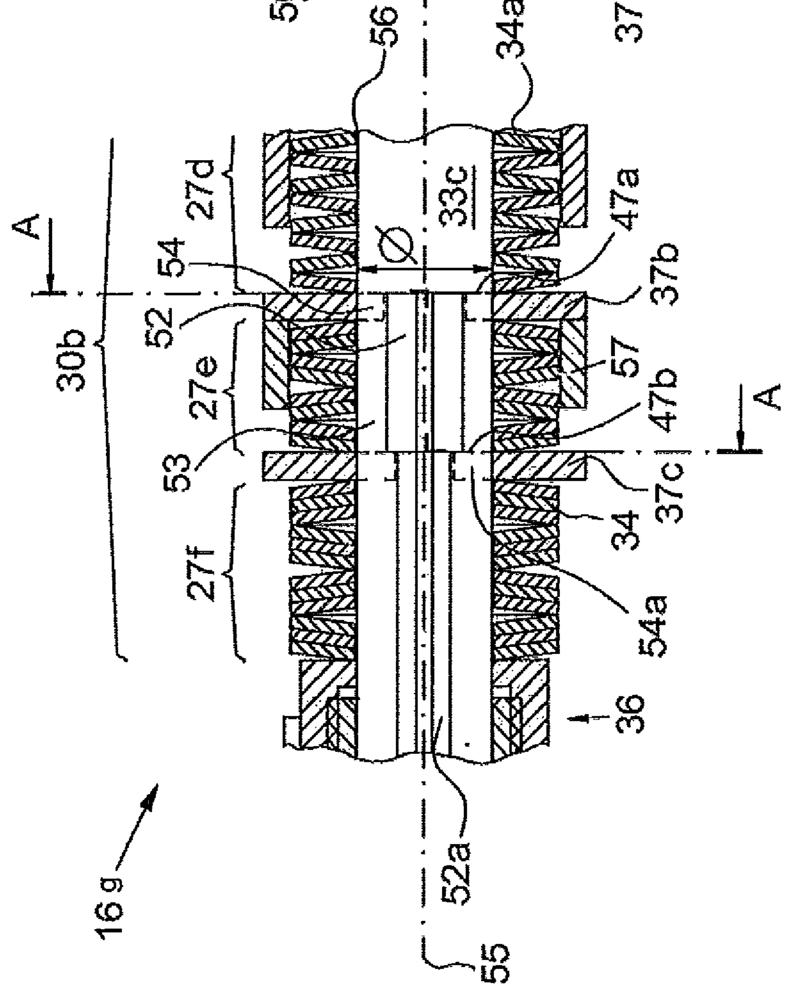
FIG. 5*b* shows a schematic sectional illustration of a part of yet another variant of embodiment in accordance with the invention of a safety brake device.

FIG. 5*b* shows a further variant of embodiment according to the invention of a safety brake device 16*g*, which comprises a pin 33*c* with groove profiles 52 extending along the longitudinal axis 55. Formed therebetween are web profiles 53 which as before correspond by an outer edge 56 with an outer diameter 0 of the pin 33*c*. As before, the plate spring 34*a* is guided on this outer edge 56 even when the washer 37*b* and a spacer sleeve 57 (the previously cylindrical housing 40 is shown in this embodiment as a washer and a sleeve) move to the left due to the compression of the middle force store element 27*e*. An analogous construction, only with a deeper groove profile 52*a*, is provided between the middle force store element 27*e* and the strongest force store element 27*f*.

FIG. 5*c* shows a sectional illustration along the section axis A-A of FIG. 5*b*. The washer 37*b* forms, along its respective inner diameter, at least two, preferably four, approximately diametrically oppositely arranged segment members 54 which run along in the respective groove profile 52. The rearward end face of the segment member 54 is thus the contact surface for the respective abutment 47*a* or 47*b*, which in this form of embodiment is no longer formed over the full circumference, but only on a certain percentage of the full circumference. The washer 37*c* forms, along its respective inner diameter, at least two, preferably four, approximately diametrically oppositely arranged segment members 54*a* which run along in the respective groove profile 52*a*. This further embodiment, in accordance with the invention, of the pin 33*c* with web profiles 53, groove profiles 52 and 52*a* and segment members 54 and 54*a* running therein has, by comparison with the solution shown in FIG. 5*a*, with respect to the dropping of the plate springs out of the guide the advantage that constructional length is saved, i.e. a greater proportion of the total travel of the force store element combination 30*b* is utilized.

The inventive features disclosed in FIGS. 3 to 5*c*, although described only in relation to the respectively illustrated variants of embodiment, can be combined with one another. Thus, for example, the composite characteristic curve shown in FIGS. 4*a*-4*c*, which was illustrated there only in conjunction with a first and a second force store element in correspondence with FIG. 3, is optionally possible also for the second and third force store elements of the FIGS. 5*a*-5*c*. Moreover, the adjustment possibility, which was described in connection with FIG. 3, of the spacing 42 can be readily realized even in the variants of embodiment according to the FIGS. 5*a*-5*c*. In addition, the separate capability of biasing, which is shown in FIG. 3*a*, of the stronger force store element is—with appropriate stressing devices—disclosed to an expert for the variant of embodiment according to FIG. 5*a*.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A safety brake device having a force store element, which by way of at least one brake lever and at least one brake shoe acting on a guide rail, generates a braking force which stops an elevator car and/or a counterweight, the force store element comprising:

a first force store element having a first force storage rate; and at least a second force store element having a second force storage rate that is higher than the first force storage rate, the first and second force store elements being connected in series to form a force store element combination, wherein the first and second force store elements are separated by a washer at a pin guiding the first and second force store elements, and during compression movements of the first and second force store elements, a limitation device which limits travel and compression for the first force store element impinges on the washer, wherein an outer diameter of the pin is substantially the same as an inner diameter of at least one of the first and second force store elements, wherein the limitation device is located on the pin and includes a radial portion and an axial portion extending from the radial portion, and wherein an end of the first force store element is seated on the radial portion of the limitation device and an edge of the axial portion of the limitation device impinges on the washer during the compression movements.

2. The safety brake device according to claim 1 wherein the limitation device and the washer form a spacing which is adjustable by at least one of an axial adjustability of the limitation device along a longitudinal axis of the pin and an axial adjustability of the washer along the longitudinal axis of the pin.

3. The safety brake device according to claim 1 wherein the second force store element has a pressure force versus travel characteristic curve which connects at a travel point with a pressure force versus travel characteristic curve of the force store element combination at which travel of the first store element is limited by the limitation device.

4. The safety brake device according to claim 1 including a first biasing device for biasing the first force store element and the second force store element.

5. The safety brake device according to claim 4 including a second biasing device for exclusively biasing for the second force store element.

6. The safety brake device according to claim 1 wherein the pin has different outer diameters forming an abutment for spacer washers.

7. The safety brake device according to claim 1 wherein the pin has a continuous outer diameter and detent positions at which spacer washers are detentable.

8. The safety brake device according to claim 1 included in a safety device for an elevator.

9. The safety brake device according to claim 1 wherein the pin is further mounted in an eye of the at least one brake lever.

10. A safety device comprising:

a safety brake device with first and second force store elements with different force storage rates, wherein the first and second force store elements are connected in series and press a brake shoe against a guide rail by a brake lever in elevator equipment with an elevator car which runs along the guide rail, wherein the first and second force store elements are separated by a washer at a pin guiding the first and second force store elements, and during compression movements of the first and second force store elements, a limitation device which limits travel and compression for the first force store element impinges on the washer, wherein an outer diameter of the pin is substantially the same as an inner diameter of at least one of the first and second force store elements, wherein the limitation device is located on the pin and includes a radial portion and an axial portion extending from the radial portion, and wherein an end of the first force store element is seated on the radial portion of the limitation device and an edge of the axial portion of the limitation device impinges on the washer during the compression movements;

a speed limiter with a limiter cable wherein tension forces of the limiter cable are transmitted to the safety brake device at the elevator car so that the brake shoe is pressed against the guide rail by the force of the first force store element up to the limitation device and by the force of the second force store element from the limitation device.

11. The safety device according to claim 10 included in an elevator equipment.

12. A method of actuating a safety brake device comprising the steps of:

providing a first force store element and a second force store element with different force storage rates, wherein the first and second force store elements are connected in series and wherein the first and second force store elements press a brake shoe against a brake rail by a brake lever, wherein the first and second force store elements are separated by a washer at a pin guiding the first and second force store elements, and during compression movements of the first and second force store elements, a limitation device for the first force store element impinges on the washer, wherein an outer diameter of the pin is substantially the same as an inner diameter of at least one of the first and second force store elements, wherein the limitation device is located on the pin and includes a radial portion and an axial portion extending from the radial portion, and wherein an end of the first force store element is seated on the radial portion of the limitation device and an edge of the axial portion of the limitation device impinges on the washer during the compression movements;

triggering the safety brake device by bringing the brake shoe into frictional contact with the brake rail;

pressing the brake shoe against the brake rail with the force of the first force store element; and upon reaching a travel limitation for the first force store element, removing the first force store element out of action and bringing the second force store element into action.

13. The method according to claim 12 wherein the bringing of the brake shoe into frictional contact with the brake rail is carried out by tension of a limiter cable, which cable moves at lower speed than an elevator car, of a speed limiter and the safety brake device is thereby triggered.

14. The method according to claim 12 wherein the bringing of the brake shoe into frictional contact with the brake rail is carried out electromagnetically.

* * * * *